C. Sellers,
Machine for Drilling and Boring Metal.
N° 41,789.   Patented Mar. 1. 1864.

Witnesses:
Theodore Bergner
Frank Lewis

Inventor:
Coleman Sellers

UNITED STATES PATENT OFFICE.

COLEMAN SELLERS, OF PHILADELPHIA, PENNSYLVANIA.

IMPROVEMENT IN MACHINES FOR DRILLING AND BORING METALS.

Specification forming part of Letters Patent No. 41,789, dated March 1, 1864.

*To all whom it may concern:*

Be it known that I, COLEMAN SELLERS, of the city of Philadelphia, in the State of Pennsylvania, have invented a new and Improved Feed-Motion for Drilling and Boring Machines for Metal or Wood; and I do hereby declare the following to be a full and exact description thereof.

The object of my invention is to so arrange the feed-motion of drilling or boring machines that a quick hand-feed and slow power-feed shall be obtained from one and the same set of wheels constantly in gear; that the drill may be fed rapidly up to its work by the hand-feed, and that a power-feed of suitable velocity shall at once go into operation upon the stoppage of the hand-feed; that the pressure of the cut may be felt when the power-feed is in operation, the hand-feed being held at rest by the hand of the operator, and that the power-feed shall continue in operation so long as the hand-feed is held at rest, either by clamping it or by the hand of the operator, and shall cease to operate as soon as the hand-feed is loosened.

The nature of my invention consists in using that combination of gearing known as the "differential motion;" in transmitting the power-feed through the differential wheels when they are at rest, and in producing the rapid hand-feed by rotating the differential wheels themselves around their driving-pinion.

To explain this so as to enable an intelligent mechanic to construct a machine on this principle, and to demonstrate the theory of its operation, I have, in the annexed drawings, making part of this specification, shown, in—

Figure 1:
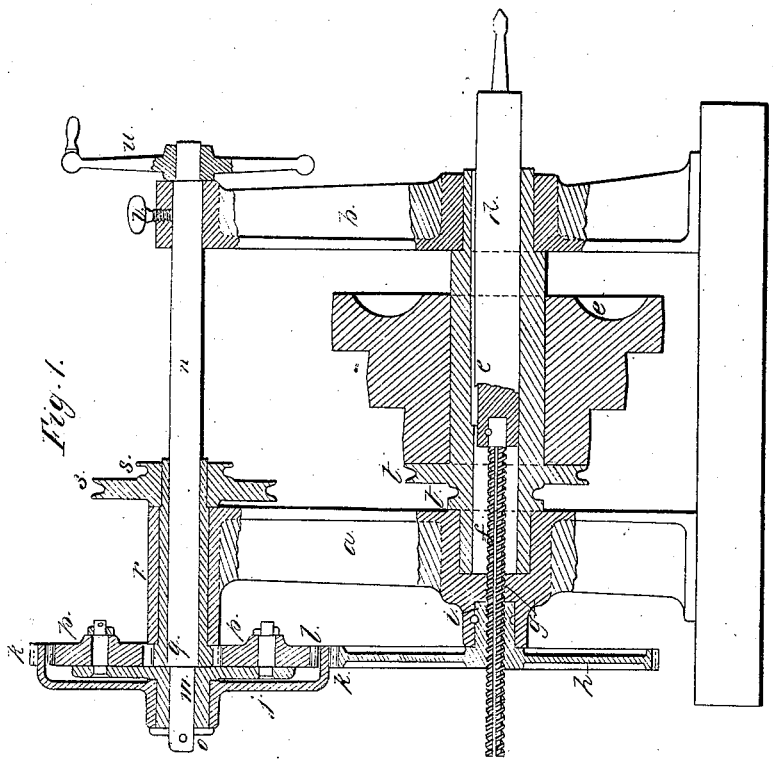
Figure 2:
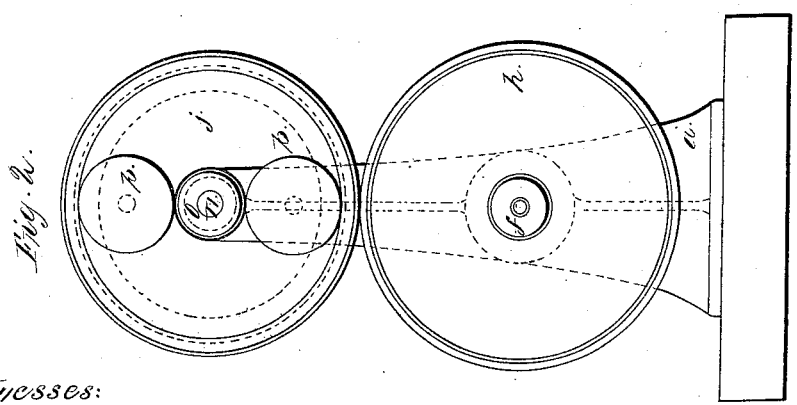

Figure 1, a sectional side elevation of a machine arranged on my plan, and in Fig. 2 an end elevation of the same.

Similar letters in each refer to similar parts.

In the drawings, $a$ and $b$ are uprights, supporting a hollow spindle, $c$. Within this spindle slides endwise the mandrel $d$. Motion is imparted to the spindle $c$ by the cone-pulley $e$, attached to it. The mandrel $d$ has swiveled to its back end a screw, $f$, of coarse pitch. This screw is splined its whole length, and is prevented from turning by a feather in the stand $a$ at the point $g$.

The nut of the screw $f$ is the hub of the gear-wheel $h$, which turns freely in the stand $a$, but is held in place by a pin in the groove $i$. Gearing into the wheel $h$ is a wheel, $j$, formed with an overhanging rim, on the outside of which are teeth $k$ to gear into the wheel $h$, and on the inside are teeth $l$, forming an internal spur-wheel.

The wheel $j$ is supported on the hub of a plate, $m$, and, turning loosely upon it, is held in place by the washer $o$. The plate $m$ is keyed to the feed-shaft $n$, and carries two spur-wheels or differential wheels, $p\ p$, running loose on studs in the plate $m$. These wheels are of such a size as to gear into the internal teeth $l$ of the wheel $j$ on the outside, and on their inside, or between them, into a pinion, $q$. This pinion $q$ is loose upon the feed-shaft $n$. Its hub extends through the bearing $r$ of the stand $a$, and attached to it are the cord-wheels $s\ s$, corresponding with the cord-wheels $t\ t$ on the spindle $c$. The shaft $n$ is continued through a bearing in the upright $b$, and has attached to it a cross-handle $u$. The thumb-screw $v$ in the upright $b$ is for the purpose of clamping the shaft $n$ and preventing it from turning.

To observe the operation of the machine while it is running: If the screw $v$ be tightened up and the shaft $n$ held at rest, motion from the spindle will be conveyed by the cord-wheels $t$ and $s$ to the pinion $q$. This will give motion to the wheels $p\ p$, and through them to the wheel $j$, the wheels $p\ p$ acting in this case as idlers to convey the slow motion of $q$ to $j$, the studs upon which they run being held at rest by the plate $m$. The motion thus given to the wheel $j$ is imparted to the wheel $h$, which is the nut of the screw $f$, and which will impart the necessary amount of feed to the mandrel $d$.

In the term "idlers," as above used, I mean that the wheels $p$ in this case convey motion, but do not modify velocity, for the effect upon the wheel $j$ is the same as if the pinion $q$ geared directly into the internal teeth $l$ of that wheel. This is the power-feed, which may be increased or diminished by using cord-wheels of different diameters at $s\ t$, or by any of the other well-known devices for modifying velocity, and this feed will continue so long as the shaft $n$ is prevented from turning, either by screwing up the screw $v$ or holding it still by means of the handle $u$. In the latter case, in the effort to hold the shaft $n$ from turning, the force imparted to the pinion of the feed-power on the wheels *p p* will be felt by the operator, and the amount of feed may be modified to increase it by pulling the handle against this pressure, or diminished by slacking it off from the pressure against the hand. If, however, the handle *u* be turned rapidly, the wheels *p p* will be driven around the slow-moving pinion *q*, and thus an increased velocity will be imparted to the wheel *j*, moving it even faster than if it were directly attached to the handle *u* and moved with it. Hence this hand-feed will be a very rapid one, enabling the drill to be moved quickly to or from its work with a manifest economy of time.

If the shaft *n* be unfastened and allowed to turn freely, the wheels *p p*, driven by the pinion *q*, will revolve slowly within the wheel *j*, turning the handle *u* at the same velocity and imparting no feed to the mandrel. It is therefore evident that the same wheels are used in the two kinds of feed—viz., in hand and power feed; that they are always in gear and in operation; that the motion derived from them is directed toward the feed to be accomplished or expended in turning the handle *u*; that by imparting to the handle *u* an accelerated or diminished velocity the feed will be effected accordingly, thus fully accomplishing all the objects as stated.

In the above specification I have shown the system of wheels forming the differential motion as composed of spur-wheels; but it is evident that bevel-wheels may be used, as is more commonly done with this kind of motion, the spur-wheels, however, being better adapted to this particular case.

I therefore wish it clearly understood that I do not limit my inventions to the precise form and arrangement of wheels as described; but

What I claim as new, and desire to secure by Letters Patent, is—

The use of that combination of gearing in which a wheel or wheels may either be made to transmit motion as idlers or by their rotation around a fixed or a moving wheel be themselves the means of modifying velocity, substantially as and for the objects specified.

COLEMAN SELLERS.

Witnesses:
   THEODORE BERGNER,
   FRANK LEWIS.